US007799419B2

(12) United States Patent
Brule et al.

(10) Patent No.: US 7,799,419 B2
(45) Date of Patent: Sep. 21, 2010

(54) HIGH TEMPERATURE GAS SEALS

(75) Inventors: Robert Brule, Calgary (CA); Xinge Zhang, Calgary (CA); Dhanwant Chahal, Calgary (CA); Zheng Tang, Calgary (CA)

(73) Assignee: Versa Power Systems, Ltd., Calgary, Alberta (CA)

( * ) Notice: Subject to any disclaimer, the term of this patent is extended or adjusted under 35 U.S.C. 154(b) by 459 days.

(21) Appl. No.: 10/707,592

(22) Filed: Dec. 23, 2003

(65) Prior Publication Data

US 2004/0135324 A1 Jul. 15, 2004

Related U.S. Application Data

(60) Provisional application No. 60/319,811, filed on Dec. 24, 2002.

(51) Int. Cl.
*B32B 5/22* (2006.01)
*D21H 13/00* (2006.01)
(52) U.S. Cl. .............................. 428/317.9; 428/311.11; 428/311.51; 428/312.6; 428/312.8; 428/920
(58) Field of Classification Search ............. 416/241 B; 428/312.2, 312.4
See application file for complete search history.

(56) References Cited

U.S. PATENT DOCUMENTS 4,933,309 A * 6/1990 Luthra ....................... 501/95.2
5,098,871 A * 3/1992 Ray ........................... 501/95.2
5,405,571 A    4/1995 Truckner et al.
5,439,627 A * 8/1995 De Jager ..................... 264/129
5,489,408 A * 2/1996 Nakano et al. .............. 264/624
5,503,122 A * 4/1996 Ritland et al. ............. 123/188.3
2002/0024185 A1   2/2002 Ghosh et al.
2004/0104544 A1* 6/2004 Fan et al. .................... 277/650

OTHER PUBLICATIONS

Lahl, N., et al. "Crystallisation kinetics in AO-A1203-Si02-B203 glasses (A=Ba, Ca, Mg)" Article, Journal of Materials Science 35 (2000) pp. 3089-3096, Dec. 3, 1999.
Chou, Yeong-Shyung, et al. "Thermal cycling and degradation mechanisms of compressive mica-based seats for solid oxide fuel cells" Article, Journal of Power Sources 112 (2002) pp. 376-383.

* cited by examiner

*Primary Examiner*—Gordon R Baldwin
(74) *Attorney, Agent, or Firm*—Bennett Jones LLP

(57) ABSTRACT

A flexible seal for use in a solid oxide fuel cell stack is formed from a fiber matrix with a plurality of solid particles through tape casting method. The fibers and particles are preferably ceramic and may be formed from alumina or zirconia. The seal may be formed by forming a slurry of fibers, particles, a binder and a non-aqueous solvent, tape casting the slurry, drying the tape seal, die-cutting, prior to installation in the fuel cell stack.

10 Claims, 5 Drawing Sheets

HIGH TEMPERATURE GAS SEALS

CROSS REFERENCE TO RELATED APPLICATIONS

The present invention claims the priority of U.S. Provisional Patent Application No. 60/319,811 filed on Dec. 24, 2002, the contents of which are incorporated herein by reference.

BACKGROUND OF INVENTION

The present invention relates to high temperature gas seals, particularly for use in a planar solid oxide fuel cell stack.

A planar solid oxide fuel cell (pSOFC) stack has three primary constituents: a ceramic electrochemical cell membrane, metallic interconnects, and an arrangement of seals. To perform the function of converting chemical energy into electrical energy, a SOFC membrane must have one electrochemical face exposed to an oxidant gas, and the other exposed to a fuel gas, all at an operating temperature above 500° C. A metallic interconnect (IC) provides fuel and oxidant gas distribution to the cells by means of separate plenums, and when arranged between cells in a stack arrangement, also transfers electrical current from one cell to another. The seals required between a ceramic cell and an interconnect in a SOFC stack must provide adequate resistance to gas permeation to contain the reactants within the gas distribution plenum, as well as provide adequate electrical isolation. The seal should preferably resist significant degradation over time, and should preferably be capable of being thermally cycled.

There are essentially two standard methods of sealing: (1) by forming a rigid joint or (2) by constructing a compressive "sliding" seal. Each method has its own set of advantages and design constraints.

Rigid joints utilizing glass joining is a simple method of bonding ceramic to metal. However, the softening point of glass limits the maximum operating temperature. In addition, because the glass-ceramic is a brittle material and forms a non-dynamic, low-yielding seal, it is imperative that the temperature dependent coefficient of thermal expansion (CTE) for each of the joining components, i.e. the ceramic cell, the seal, and the metallic IC, be approximately equal. If not, high thermal stresses can develop within the components during stack heat-up and/or cool-down, causing fracture of the cell or seal. Only a narrow range of high temperature glass compositions within the borate- or phosphate-doped aluminosilicate families display coefficients of thermal expansion that match those of the ferritic stainless steels commonly employed in stack interconnects and housings. Unfortunately, these glasses typically display signs of devitrification within the first few hours of exposure at operating temperature. As the glass begins to crystallize, its carefully engineered thermal expansion properties change significantly, ultimately limiting the number of thermal cycles and the rate of cycling at which the resulting joint is capable of surviving. Even if the coefficients of thermal expansion are matched, non-uniform thermal expansion can still result, as the thermal conductivities of the stack components are typically not matched. As glass is an inherently brittle material, it cracks and fails under thermal cycling conditions, and as a result of jarring shocks or vibrations, which is often the case in mobile applications.

A further disadvantage of glass seals is that they can have a chemical incompatibity with electrocatalytic cells, leading to performance degradation during operation. SOFCs are particularly sensitive to alkali elements contained in many glass seals, which have been found to detrimentally affect the SOFC catalyst. Glass composition and phase shifting due to interaction with contact materials is also a problem for long-term service.

Compressive sealing is an alternative method. A compliant high-temperature material is captured between the two sealing surfaces and compressed, using a load frame external to the stack, to deliver sealing in the same way rubber gaskets are used in everyday appliances. Because the seal conforms to both sealing surfaces and is under constant compression during use, it forms a dynamic seal. That is, the sealing surfaces can slide past one another without disrupting the seal property and CTE matching is not required between the ceramic cell and the metallic IC. However, compliant seals of this nature suffer from the disadvantage of inadequate sealing performance, primarily due to the lack of a reliable high-temperature sealing material that would form the basis of the compliant seal. A number of materials have been considered, including mica, nickel, and copper, but each has been found deficient for any number of reasons, ranging from oxidation resistance in the case of the metals to poor hermeticity and through-seal leakage with respect to the mica. In the case of mica, while being able to withstand high temperatures, the natural variance in thickness of mica sheets and the relative non-compressibility of the mica both contribute to this poor sealing behavior. Additionally, it has been found that the mica may leach minerals that can poison the catalyst in the cell.

Therefore, there is a need in the art for a seal suitable for use in a high temperature fuel cell that mitigates the difficulties found in the prior art.

SUMMARY OF INVENTION

The present invention is related to a process to form a reliable gasket-type seal with a designed sealing property in high temperature applications such as high temperature fuel cells, and pSOFC's in particular. The seals of the present invention comprise plastically deformable ceramic green tape reinforced by ceramic fiber with high ceramic powder loading. The ceramic green seal may be fired, but not sintered, once installed in a fuel cell stack, preferably during an initial thermal cycle of the stack.

In accordance with one aspect of the present invention, there is provided a seal for sealing solid oxide fuel cells from adjoining cells within a SOFC stack, and sealing the input gases from each other whilst moving through the stack. In one embodiment, the seal comprises a matrix of ceramic fibres and a plurality of solid particles interspersed between the ceramic fibres.

In one embodiment, the seal further comprises a binder material, which may preferably be an organic binder. The fibres may be randomly oriented. In a preferred embodiment, the seal may be pre-compressed prior to use.

The ceramic fibres may be selected from the group comprising alumina, zirconia, titania, magnesia or silica. The solid particles may be ceramic particles, glass particles or other inert materials able to resist degradation and sintering at the operating temperatures of the SOFC stack. If the particles are ceramic particles, the particles may be selected from the group comprising alumina, zirconia, titania, magnesia or silica.

In one embodiment, a slurry of fibres and powders is tape cast to form a flexible seal with an overall density that may be greater than that of a seal which is formed by dipping a ceramic felt or paper in a ceramic powder slurry. In order to maintain compressibility and flexibility, the particle sizes may range in size from about 5 µm in diameter and to about 0.75 µm in diameter.

In another aspect, the invention may comprise a high temperature gas seal, comprising ceramic fibres, ceramic powder, and a binder in its green or pre-fired state, wherein the seal is unsintered and has a pre-fired porosity less than about 50%. The seal may be particularly useful in a high temperature fuel cell stack, such as a planar solid oxide fuel cell. Preferably, the seal may have pre-fired porosity of less than about 45%. More preferably, the seal may have a pre-fired porosity of less than about 40%. Most preferably, the seal may have a pre-fired porosity of less than about 35%. Preferred embodiments of the seal may have fired densities of less than about 50%. Upon firing, the seal may lose substantially all of the binder.

BRIEF DESCRIPTION OF DRAWINGS

The invention will now be described by way of exemplary embodiments with reference to the accompanying simplified, diagrammatic, not-to-scale drawings. In the drawings.

DETAILED DESCRIPTION

The present invention provides for a seal suitable for use in a solid oxide fuel cell operating in excess of 500° C. and which experiences thermal cycling. The seals described herein may be suitable for use in other high temperature gas sealing environments, and in high temperature fuel cells in particular. When describing the present invention, the following terms have the following meanings, unless indicated otherwise. All terms not defined herein have their common art-recognized meanings.

The term "about" refers to a range above and below a stated figure which encompasses acceptable experimental or measurement error, given the known and accepted precision of standard methods of measurement.

The term "pre-fired" refers to green ceramic material which has not been heated above a temperature where a substantial proportion of organic material within the ceramic material is burnt out. In a planar solid oxide fuel cell, the green tape seal which is installed and has not yet experienced a thermal cycle which reached an operating or elevated temperature, typically in excess of 500° C., may be considered "pre-fired". The term "fired" refers to the ceramic material after it has been heated above a temperature where a substantial proportion of organic material within the ceramic material has burned out. A fired seal may or may not be sintered. A seal which has been installed in a fuel cell stack which has experienced at least one thermal cycle which reached an operating or elevated temperature may be considered to have been "fired".

The term "ceramic" refers to inorganic non-metallic solid materials with a prevalent covalent or ionic bond including, but not limited to metallic oxides (such as oxides of aluminium, silicon, magnesium, zirconium, titanium, chromium, lanthanum, hafnium, yttrium and mixtures thereof) and non-oxide compounds including but not limited to carbides (such as of titanium, tungsten, boron, silicon), suicides (such as molybdenum disicilicide), nitrides (such as of boron, aluminium, titanium, silicon) and borides (such as of tungsten, titanium, uranium) and mixtures thereof; spinels, titanates (such as barium, lead, lead zirconium titanates, strontium titanate, iron titanate), ceramic super conductors, zeolites, ceramic solid ionic conductors (such as yttria stabilized zirconia, β-alumina and cerates).

Figure 1:
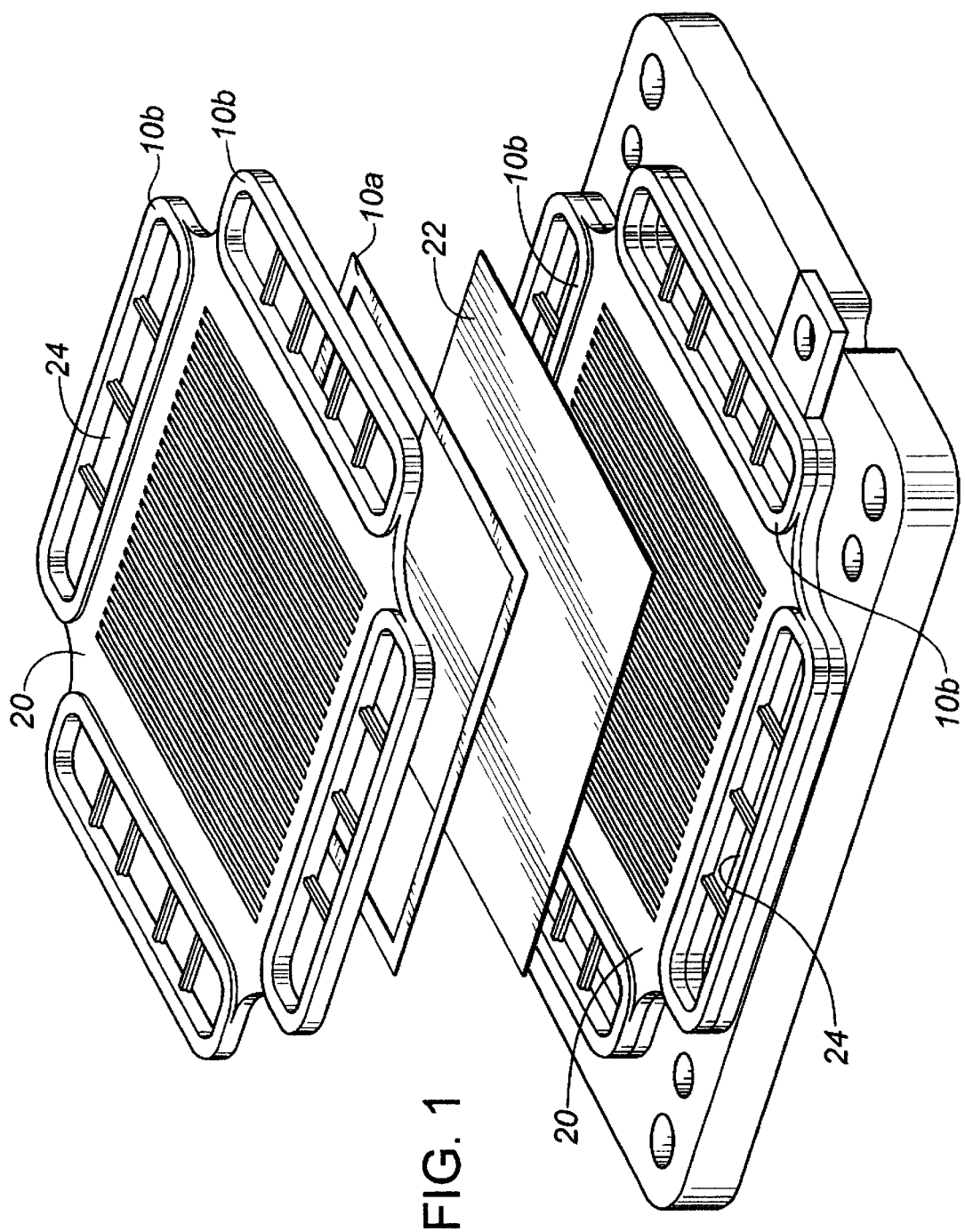
FIG. 1 is a view of a fuel cell arrangement, showing seals of the present invention in position.

In FIG. 1 a portion of a fuel cell stack is illustrated. A seal (10a) is shown fitted between two interconnects (20), and a fuel cell (22). Seals (10b) are also shown surrounding the gas manifolds (24), which conduct the fuel and air separately to the cell. It is important to keep these two gas flows sealed inside their respective manifolds, for both efficiency and safety reasons. The seals (10a, 10b) of the present invention are not limited to seals having the shape or configuration illustrated nor is the configuration of the fuel cell stack intended to limit the claimed invention in any manner.

The seals are composed of two essential elements: fibres (12) and particles (14). The fibres (12) form the backbone and are essential for the strength and flexibility inherent in this class of seals. The filler particles (14) are interspersed within the fibre skeleton to provide adequate sealing performance. The fibres should be capable of remaining flexible at the cell's operating temperature, and retain the ceramic filler particles within the fibre matrix. The fibres and particles should also not sinter at operating temperature and the particles should be capable of filling the voids in the fibre matrix sufficiently to form a seal that is substantially impervious to the stack gases.

The fibres and the filler particles may be alumina, zirconia, titania, magnesia or other suitable ceramic material or mixtures of suitable ceramic materials. A suitable ceramic material is preferably inert or chemically compatible with the fuel cell components and chemically stable in oxidizing and reducing environments. Silica compounds are also potentially useable however, they are not indicated for most applications because of their tendency to react with hydrogen, vaporizing and degrading cell performance. In one embodiment, the fibres are alumina, and the filler particles are either zirconia or alumina. Many other combinations are possible and the choice of suitable ceramic materials would be well within the skill of one skilled in the art.

Metal fibres or particles may be used but are not preferred because of their electrical conductivity, tendency to be unstable or oxidize at fuel cell operating temperatures and their tendency to sinter or coalesce at those temperatures. Nevertheless, certain metals may be utilized in certain applications, substituted in whole or in part for a ceramic material. A suitable metal fibre or metal powder should preferably be limited to a certain amount, preferably less than about 20% volume percent. It is also preferred to select metal powders and fibers which may generate a superficial oxide layer to lower electrical conductivity, and to sinter and bond to the sealing surfaces. Suitable metals may include aluminium, iron and alloys.

When the seal is compressed in the fuel cell stack, the particles block the potential leakage paths or create a very torturous leak path for the gases, providing a non-hermetic but effective seal. The fibres act as a physical restraint to the ceramic powder, allowing the shape to be formed and maintained throughout its service life. The ceramic powder is packed into the alumina matrix, but is not sintered into a contiguous member and remains unsintered at the operating temperatures of the fuel cell, which may be typically in the range of 500° C. to 1000° C. Because the ceramic components of the seal are not sintered, the seal may flex or experience thermal expansion or contraction without breaking down. As well, non-adhesive installation allows for easy assembly and disassembly, allowing for component reuse, and for increased resistance of the seal to vibrations, permitting use in a wider variety of applications, such as automotive.

Figure 2:
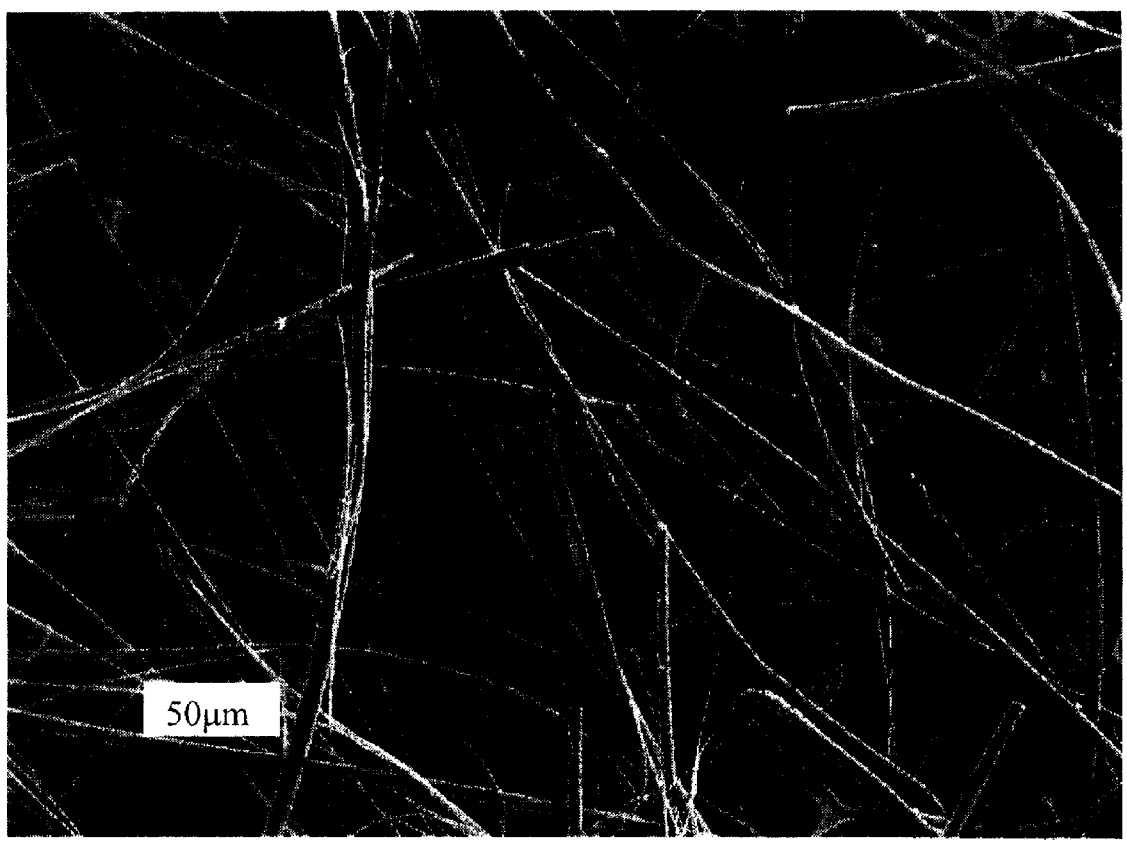
FIG. 2 is a scanning electron micrograph (SEM) photo of an alumina fibre matrix prior to particle loading at 3000× magnification.

The fibre matrix may be formed from randomly oriented fibres formed into a highly porous mat or felt. Alternatively, the fibres may be woven or oriented in some manner. In one embodiment, the fibre matrix may have about 90% porosity (prior to particle loading) and have a density in the range of about 4 to about 15 pounds/ft$^3$ (0.064 to 0.24 g/cm$^3$). The fibre matrix is highly compressible. Even when highly compressed, the fibre matrix by itself performs very poorly as a sealing element. FIG. 2 shows a microphotograph of a fibre (14) matrix in the form of a commercially available alumina fibre paper, as received from the manufacturer in their uncompressed state, and without the ceramic particles. Suitable alumina fibre felts or ceramic papers are commercially available, such as Kaowool™ available from Thermal Ceramics, Augusta, Ga. Kaowool™ contains a small proportion of silica fibres and an organic binder. The organic binder will vaporize or burn on first use as a result of the elevated fuel cell operating temperature.

In the present invention, it is the combination of the particles within the fibre matrix which provides adequate sealing performance. Any suitable process may be used to load the powder into the fibre matrix. In one embodiment, the seal may be formed by first making an alumina felt from alumina fibres and then forming and rolling into a sheet to a desired thickness. The felt may then be soaked in a suspension of ceramic powder in a liquid media such as an alcohol, in a process referred to herein as dip impregnation. The liquid media may be any liquid but preferably should have low surface tension and be relatively volatile to allow quick evaporation. Alcohols such as ethanol and isopropanol are effective liquid media for this purpose. The ceramic powder is drawn into the matrix of the felt by the capillary action of the felt, and thus creating a reasonably dense sealing media. After absorption of the ceramic powder, the felt is dried to remove the ethanol and the felt is cut or punched to the required size and shape of seal desired. The seal may then be pre-compressed prior to installation or it may be pre-compressed prior to cutting or punching.

For dip-impregnated seals, the ceramic particles, which may comprise zirconia or alumina particles, may be uniformly submicron in size and preferably less than 0.5 μm in diameter. In another embodiment, the particles are about 0.17 μm in diameter or less. Good results were achieved in an embodiment comprising a mixture of larger (0.5 μm) particles and smaller (0.17 μm) particles. In one preferred embodiment, a suspension made up of 8% by volume suspension of larger zirconia particles and 8% by volume smaller zirconia particles, mixed in a ratio of 55:45 larger particle suspension to smaller particle suspension, resulted in an effective seal.

In a preferred embodiment, the dip-impregnated seals may be compressed prior to usage in a SOFC stack. A large performance gain may be achieved with a pre-compressed seal over a seal that was not pre-compressed. This improvement in performance results because the compressive force achieved in a pre-compression step may be higher than that achieved within a fuel cell stack, which leads to an increase in the overall density. The seal may be pre-compressed in a hydraulic press, and while sealing performance increased with greater pre-compression, so may the difficulty in retrieving the seal from the press after being compressed, due to the tendency of the seal to stick to the platen of the press. Various well-known methods are available to reduce the sticking. Preferred methods include the use of release materials such as non-stick coatings or sheets of paper between the press platen and the seal. The resulting seal may have any suitable thickness and is largely dependent on the thickness of the fibre matrix before impregnation with the particles and the amount of pre-compression that is used. In one embodiment, the seals may vary in thickness from about 0.020" to about 0.067" (0.51 mm to about 1.70 mm) prior to pre-compression. If the seals are pre-compressed, they may be compressed down to a thickness of about 0.008" (0.20 mm).

In a preferred embodiment, the seals may have a porosity of less than about 50% which equates to a pre-fired density of less than about ½ the density of the solid material used in the seal. The physical density of solid alumina, for example, is about 4.0 g/cm$^3$. Therefore, a seal which comprises alumina fibres and particles which has a pre-fired density of about 2.0 g/cm$^3$ will be approximately 50% porous. Preferably, the seals may have a pre-fired porosity of less than about 45%, more preferably less than about 40% and most preferably less than about 35%. Seal porosity may increase upon firing, as the organic binder and other components are pyrolyzed. The magnitude of porosity increase will vary depending on the proportion of organic binder in the seal, and other factors which are well-known to those skilled in the art.

Generally, it is difficult to produce seals with the preferred low porosities (high densities) by dip impregnating ceramic felts or papers. However, the applicants have discovered that suitable high density seals may be made by tape-casting methods. Generally, tape casting is a shape forming technique for powders which produces thin flat sheets. A powder slurry layer is formed on a carrier film by the shearing action of a doctor blade on a moving ceramic slurry. The tape is then dried. The tape contains a binder system which gives it enough 'green strength' for it to be removed from the carrier film without damage. The ceramic slurry may be a multicomponent systems usually containing: the ceramic fibres or powder, a dispersant to stabilize the powder against colloidal forces, a solvent to reduce the mix viscosity to allow casting, a binder for green strength in the cast tape and a plasticizer to modify the properties of the binder. The formulation of such slurries is well within the skill of those skilled in the art.

In one embodiment of the present invention, a slurry of fibres and powders may be tape cast to form a flexible seal with an overall density that is significantly greater than that of seals described by the prior art. The purpose of the fibre is to give certain strength and flexibility to the seal after binder burnout. In the case of using alumina as structural material the powder packing density may be about 2.6 g/cm$^3$ in a green tape and about 2.3 g/cm$^3$ fired tape-cast seal. A density of 2.3 g/cm$^3$ is equivalent to a porosity of less than 43%. We have found that maintaining relatively large particle sizes in the powder allows relatively good compressibility, flexibility, and high powder loading density. In one embodiment, for example, 60% of the particles are about 5 μm in diameter and the remainder may be about 1 μm in diameter.

The green tape which may be formed by a tape casting method may also be formed by other well-known forming technology for tape such as pressing rolling, slurry coating, shear compaction, cold pressing.

In a preferred embodiment, a slurry may be created with the following ingredients in the proportions indicated (all in weight %): alumina fibres (5-40%), alumina powder (50-90%) a plasticizer (1-15%), organic binder (2-5%), a dispersant (>1%), and a solvent. The alumina fibres may comprise commercially available Saffil HA™ and/or Saffil RF™ fibre. The alumina powder may comprise commercially available Alcoa A15-SG™ alumina powder. Suitable plasticizers include polyethylene glycol, dibutyl phthalate or benzyl butyl phthalate, either alone or in combination. Suitable organic binders include polyvinyl butyral. Suitable dispersants may include a phosphate ester. Suitable solvents may include aliphatic or aromatic hydrocarbons, either singly or in combinations, and may preferably be a mixture of toluene, methyl i-butyral ketone and ethanol or a 2:1 mixture of methyl-ethyl ketone and ethanol.

The alumina fibres may have an aspect ratio of between about 10 to about 2000, although the aspect ratio of the fibres is not an essential variable. In one embodiment, commercially available Saffil™HA or Saffil™ RF (Saffil Ltd., United Kingdom) alumina fibres may be used. Saffil™ alumina fibres comprise relatively pure alumina with a silica content of less than about 5% and impurities of less than about 0.5%. The average fibre diameter is about 3 μm and lengths ranging from about 0.5 mm to about 5 mm prior to mixing. Vigorous mixing will cause fibre breakage and likely reduce the average fibre length significantly. Other ceramic fibres may be suitable, including zirconia, titania or magnesia.

The alumina powder may have a particle size of less than about 50 μm and preferably less than about 20 μm and more preferably less than about 10 μm. In one embodiment, alumina powder having a bimodal particle size distribution was found to be effective. Commercially available Alcoa A15-SG™ is one example of high purity alumina powder having a suitable bimodal particle size distribution with small particles in the range of about 0.2 1.5 μm and larger particles in the range of about 1.5 20 μm. Other ceramic powders besides alumina may be suitable, including zirconia, titania or magnesia.

The slurry may then be mechanically mixed, preferably in a manner that minimizes fibre breakage and replenishes lost solvent, such as in a ball mill or with a mixer. The amount of solvent initially added and maintained during mixing may be varied to vary the viscosity of the slurry. The type and amount of binder added to the formulation may also affect the viscosity of the slurry. Typically, sufficient solvent is added to produce a slurry having a viscosity of between about 1000 cp to about 50,000 cp. The slurry may then be degassed and tape cast onto silicone coated Mylar™ sheets and dried, as is well known in the art.

The green seal tape may then be cut to size and shape. The resulting seals may have a density of about 2.00 g/cm³ to about 2.90 g/cm³, which will decrease to about 1.60 to about 2.70 g/cm³ after firing. The seals may have a porosity of between about 25% to about 50%, which will increase upon firing to a range of about 35% to about 60% based on the tape solid loading. Seals created from this tape cast method may be denser and less porous than those created by dipping or otherwise impregnating ceramic felt in a ceramic particle suspension. Therefore, it is not always necessary to pre-compress the tape cast seal prior to installation in order to obtain effective sealing results.

The seal may then be used in the assembly of a fuel cell stack. Any remaining organic components are burned away at the operating temperature of the fuel cell (firing).

Figure 3:
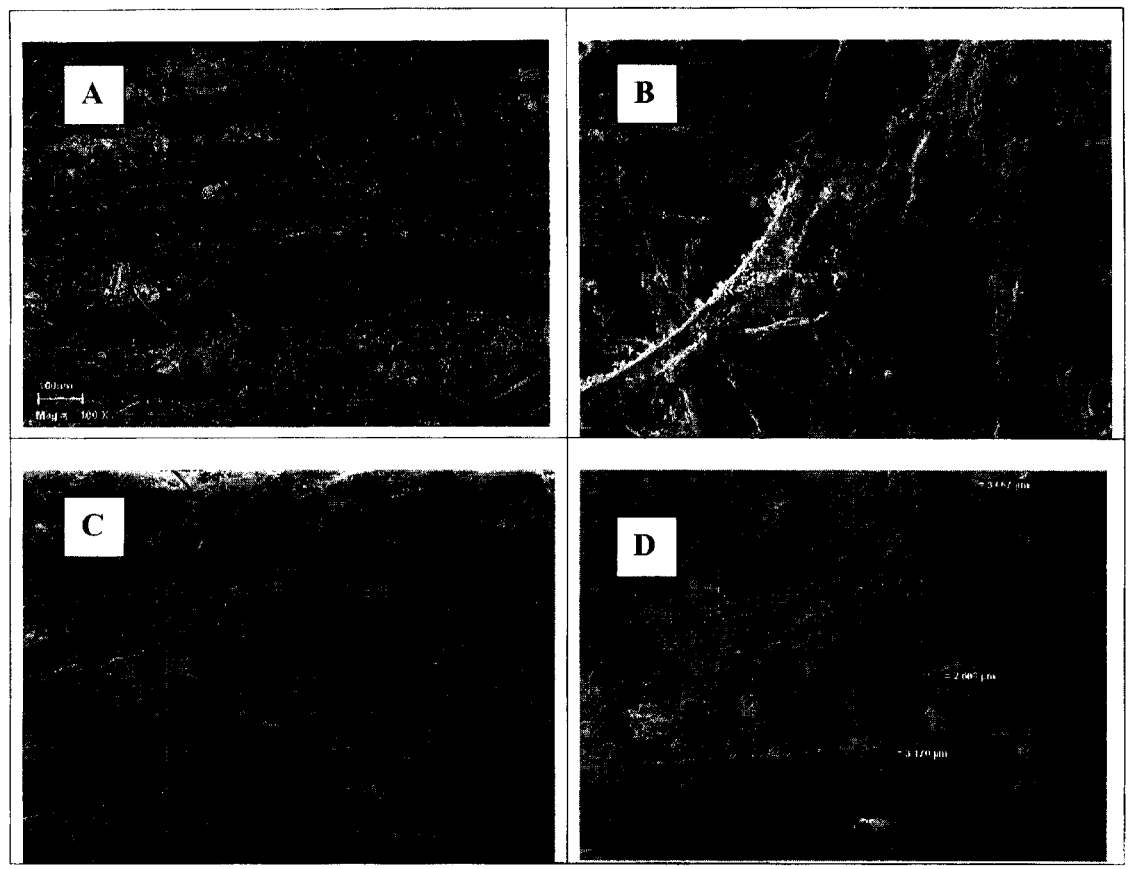
FIGS. 3A and 3B show a cross section of an alumina dip-impregnated seal.
FIGS. 3C and 3D show a cross section of an alumina tape cast seal after a high temperature leak-rate test.
Figure 4:
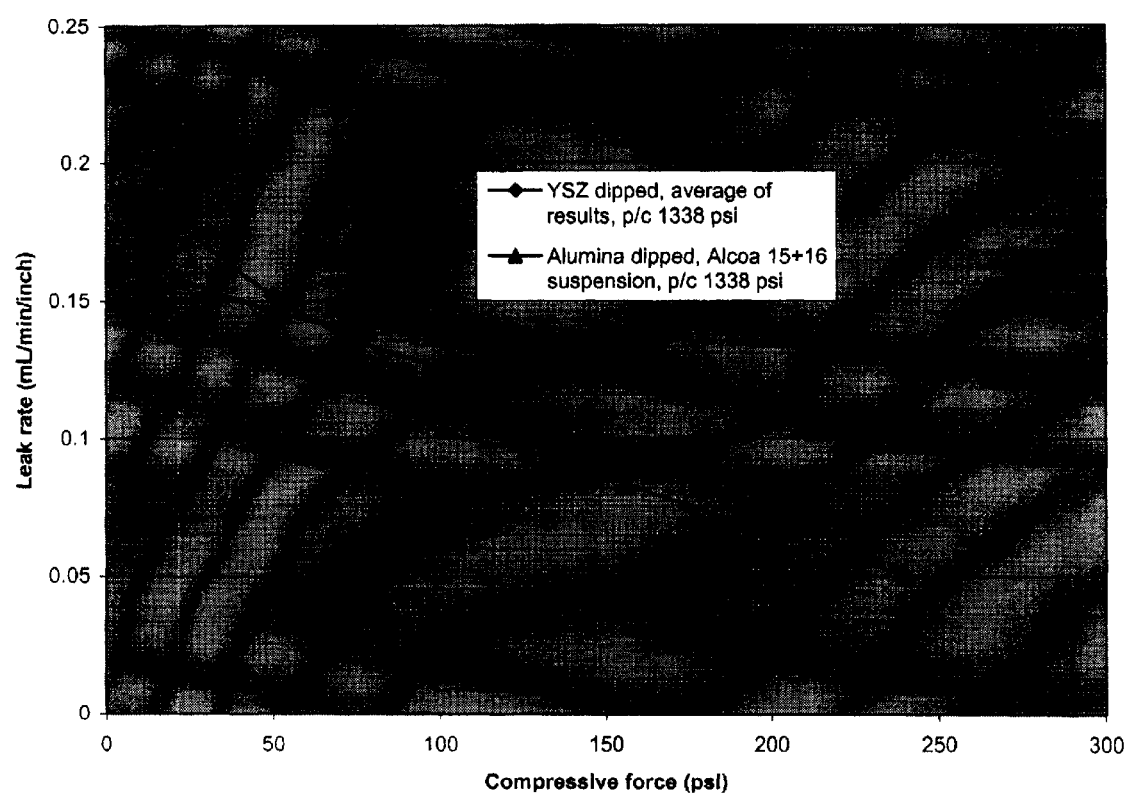
FIG. 4 is a graph showing leak rate test results of seals prepared by the dip-impregnation technique.
Figure 5:
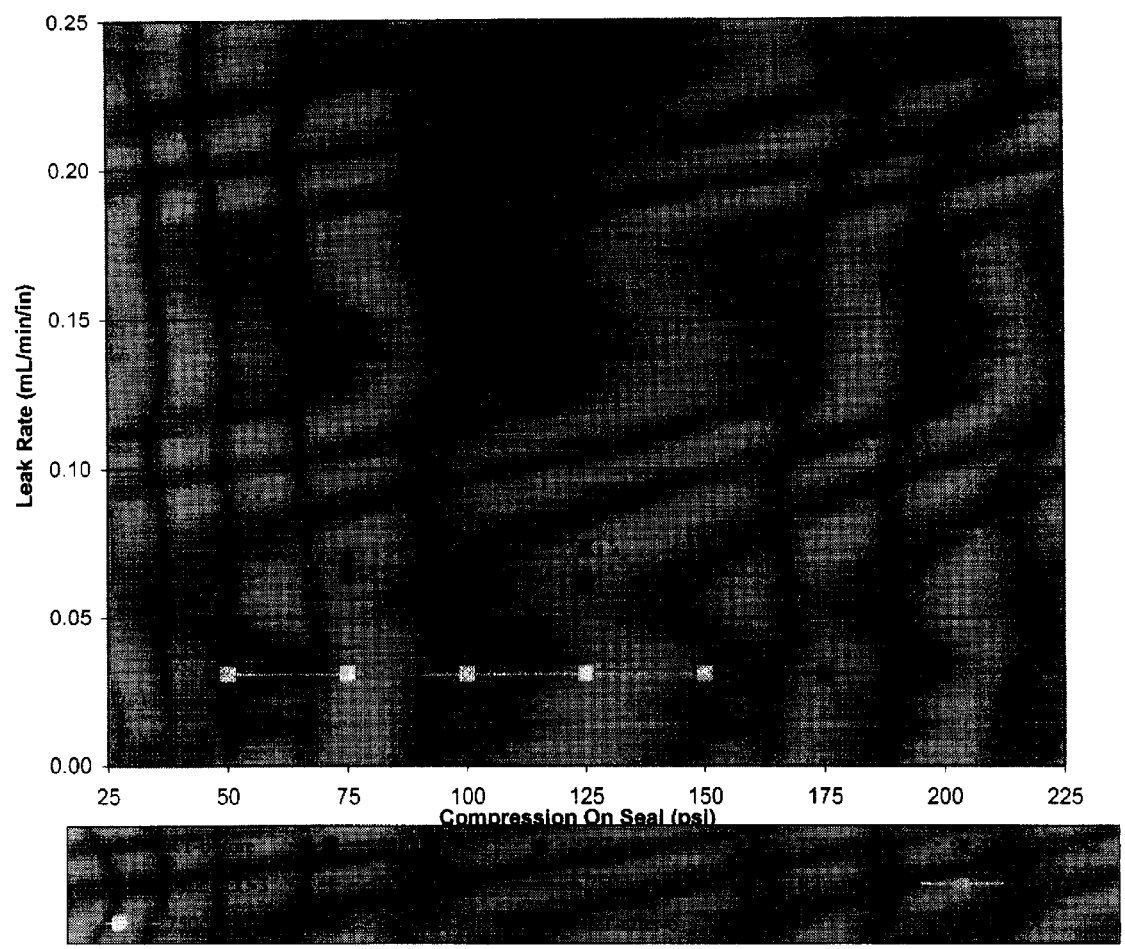
FIG. 5 is a graph showing leak rate test results of tape cast seals before and after thermal cycling.

FIG. 3 shows a cross-section view of a dip-impregnated (A and B) and a tape cast (C and D) seal. At low magnification, the macroporosity of the dip-impregnated (A) seal is much larger than that of the tape cast (C) seal. At high magnifications, the uniform porosity of the tape cast (D) seal is visible. It is believed that the majority of gas leakage with the dip-impregnated seals, demonstrated in FIG. 4, is due primarily to issues with the inconsistent and large macroporosity and due to the interface of the seal with the fuel cell or interconnect. The tape cast seals do not have these problems, since the porosity is more uniform and by compressing the seal in service prior to burning out the organic component, the seals conform to the irregular surface.

Unused tape seals may be recycled by re-dissolving the seal in a solvent and recasting the resulting slurry in the same manner as the original seal was tape cast. The ability to recycle unused tape cast seals may significantly improve the economics of seal production using this method.

EXAMPLES

The following examples are intended to exemplify the present invention and are not intended to limit the claimed invention in any manner.

Example 1

Preparation of Dip Impregnated Seal and Room Temperature Leakrate Testing

Zircar™0.040"$Al_2O_3$ fiber felt was cut out into seal size 10×10 cm. The cut pieces of Zircar were then placed on a small square of Mylar™(about 15 cm×15 cm) and immersed in either (A) 8 vol % zirconia or (B) 10 vol % $Al_2O_3$ suspension solutionbath for 15 seconds using light agitation. The Mylar™ was then lifted and tilted in a circular motion to distribute the remaining solution and to allow any excess solution to drip off. The seal was allowed to dry on the Mylar™ sheet for approximately 90 minutes. Once dried the weight, Wd, was recorded and some of the seals were dipped 2 or 3 times with weight recorded after each dipping.

Leak rate was measured at room temperature with air as test gas, the test device is composed of two polished steel plates, hydraulic pressure supplier, pressure sensor, air pressure adjustor and gauge, and leak rate flow-meters. The thickness of the seal under the test was measured by a feeler gauge.

The weight of Zircar™$Al_2O_3$ felt after die-cut, Wp, is about 0.302-0.305 g, The seals were dipped up to 3 times in 8 v % YSZ and 1-2 times in 100 v % $Al_2O_3$. Each seal was pre-compressed at 1500 psi for 2 mins before leak rate testing.

Table 1 lists the loading amount (Wd total weight of a seal), thickness at the compressive pressure of 150 psi and the packing density of tested seals with different number of dips.

TABLE 1

Leak rate (LR) vs. different loading amount of powder
test condition: T = $T_{room}$; $P_{air}$ = 0.5 and 1.0 psi, $P_{compress}$ = 150 psi

| | YSZ | | | | | $Al_2O_3$ | | | |
|---|---|---|---|---|---|---|---|---|---|
| | Powder Loading | | | LR ml/ min/inch | | Powder Loading | | | LR ml/ min/inch |
| Dip no. | Wd (g) | t (mm) | D g/cm³ | 0.5 psi | 1.0 psi | Wd (g) | t (mm) | D g/cm³ | 0.5 psi | 1.0 psi |
| 1 | 1.852 | 0.36 | 1.96 | 0.53, 0.75 | 1.15, 1.54 | 1.611 | 0.38 | 1.62 | 0.66, 0.93 | 1.32 2.15 |
| 2 | 3.162 | 0.55 | 2.19 | 0.41, 0.46 | 0.70, 0.75 | 2.656 | 0.61 | 1.66 | 0.34, 0.36 | 0.80, 0.76 |
| 3 | 4.305 | 0.72 | 2.27 | 0.41 | 0.80 | | | | | |

Based on measured powder loading density of the seal for both YSZ and $Al_2O_3$ under the compressive force of 150 psi, the porosity of the seal is higher than about 60%.

Table 1 shows that gas leak rate, LR, is decreased by increasing the powder loading density. This leak rate testing was performed at room temperature.

Example 2

Tape Cast Seal Formulations

TABLE 2

Tape Cast Seal Formulations

| Trial # | Fibre Type | Fibre Wt % | Powder Wt % | Solvent | Plasticizer |
|---|---|---|---|---|---|
| 1 | Saffil HA | 15 | 85 | MEK/EtOH | PEG/DBP |
| 2 | Saffil HA | 20 | 80 | MEK/EtOh | PEG/DBP |
| 3 | Saffil HA | 20 | 80 | MEK/EtOH | PEG/DBP |
| 4 | Saffil RF | 20 | 80 | MTBK/Toluene/ EtOH | Santicizer 160 ™ |

Tape cast seals were formed by mixing alumina fibres with alumina powder in either 15:85 or 20:80 weight proportion, on a ceramic basis. A tape-casting slurry was formed using either methyl ethyl ketone (MEK) (66.6 wt %) and absolute anhydrous ethanol (33.3 wt %) as the solvent system or a mixture of MIBK, toluene and anhydrous ethanol. The MEK/EtOH formulations use polyethylene glycol 400 (PEG) and dibutyl phthalate (DBP) as the plasticizer, while the MIBK solvent system utilized Santicizer 160™ (benzyl butyl phthalate). Either Butvar® B76 or B79, or mixtures of both, were used as polyvinyl butyral (PVB) binders, which include small amounts of polyvinyl alcohol and polyvinyl acetate. The slurry formulation also included Emphos PS236™ as a commercially available phosphate ester dispersant.

Slurry Preparation:

A 2 liter bottle with 1500 grams of 9.5 mm diameter alumina grinding media was used to disperse the alumina powder. The powder, solvent and dispersant were added first and then ball milled for 2 hours at ~100 rpm. Then, the plasticizer and binder were added and ball milled for an additional 2-6 hrs. The fibre was then added to this mixture. In other trials, a mixer was used to disperse the fibres. With this method, the slurry was poured into the mixer first and the fibre was added over a period of ½ to 1 hour. During fibre addition, it is necessary to add additional solvent to replenish the solvent lost to evaporation and to produce a slurry suitable for tape casting.

Tape casting: The slurry formulations were tape cast on to silicone coated Mylar®. Table 3 indicates a number of tape casting trials using the formulation from Table 2. Trials were performed without degassing and with degassing for 30 minutes at a vacuum of 65-70 kPa. Cast tapes were allowed to dry about 4 hours before being removed from the Mylar®. The density and shrinkage summary are listed in Table 5.

TABLE 3

Trial Summary

| Trial # | Solvent System | Fibre Wt % Fibre | Fibre Type (Saffil) | Viscosity at 25° C. | Casting Speed (cm/sec) | Doctor Blade Opening (mm) |
|---|---|---|---|---|---|---|
| 1 | MEK/EtOH | 15 | HA | 20191 | 1 | 1.3 |
| 2 | MEK/EtOH | 20 | HA | 17881 | 1 | 1.3 |
| 3 | MEK/EtOH | 20 | HA | 19565 | 1 | 1.3 |
| 4 | MIBK/Tol/ EtOH | 20 | RS | N/A | 1 | 1.3 |

Example 4

Density, Shrinkage and Leakrate Testing

Density and shrinkage data were collected for each tape. Four 1 square inch pieces were cut and measured for density. Two of these pieces were then fired at 750 deg. C. for 1 hour to burn out the organics. These same pieces were then re-measured to determine their post firing density and shrinkage values. Table 4 is a summary of this data.

TABLE 4

Density and Shrinkage Summary

| Trial # | Green Density (g/cm³) | Fired Density (g/cm³) | Green Porosity (%) | Fired Porosity (%) | Average Green Thickness (mm) | Average Shrinkage X – Y (%) | Average Shrinkage Z (%) | Leakrate (ml/min/in)* |
|---|---|---|---|---|---|---|---|---|
| 1 | 2.78 | 2.51 | 29.9 | 36.7 | 0.515 | −0.05 | −1.17 | 0.03 |
| 2 | 2.18 | 2.03 | 45.1 | 48.9 | 0.875 | −0.06 | −0.69 | 0.05 |
| 3 | 2.86 | 2.54 | 28.0 | 36.0 | 0.455 | −0.04 | 0.10 | 0.03 |
| 4 | 2.53 | 2.29 | 36.4 | 42.3 | 0.519 | 0.29 | −0.10 | 0.03 |

*Leakrates were tested at a 50 psi compressive force, 750° C., 0.5 psi air. The test device detection limit was 0.03 ml/min/inch.

Example 5

High Temperature Leakrate and Thermal Cycling

Dip-impregnated seals (both YSZ and alumina particle dips) were tested with air at 750° C. at 0.5 psi under different compressive forces. The seals were pre-compressed with a force of 1338 psi prior to installation in the test jig. The results are shown in FIG. 4. As shown, leak rates decreased nearly linearly as compressive force on the seal increased to 250 psi. The leak rate of dip-impregnated seal was 0.15 ml/min/inch at 750° C. under 50 psi compressive force, much higher than that of tape cast seal.

Lower leak rates were tested with tape cast seals from Trial#1-#4. Seals from trial #4 were tested in a thermal cycle from room temperature (RT) to 750° C. in 6 cycles. Leak rates were tested in the same range of compressive forces during each of the thermal cycles. As shown in FIG. 4, leakage rates were less than 0.10 ml/min/inch throughout the range of compressive force, even as low as 50 psi of compressive force at room temperature. Furthermore, the leak rates were consistently low throughout the thermal cycles. In some cases, the leak rates were tested at the detection limit of 0.03 mL/min/in at 750° C. Therefore, tape cast seal also shows good thermal cycling capability in terms of the measured leakrate data after a number of thermal cycles.

As will be apparent to those skilled in the art, various modifications, adaptations and variations of the foregoing specific disclosure can be made without departing from the scope of the invention claimed herein.

The invention claimed is:

1. A solid oxide fuel cell stack comprising a plurality of adjoining fuel cells, wherein the fuel cells are mutually sealed in a gas-tight manner by a seal formed of:
    ceramic fibres providing a matrix for retaining ceramic powder, and being capable of remaining flexible at operating temperatures of the fuel cell;
    ceramic powder being disposed within the matrix, a substantial proportion of the ceramic powder having a particle size of about 5 μm in diameter;
    the ceramic fibres and powder being capable of resisting sintering at operating temperatures of the fuel cell, wherein the seal is substantially free of binder and has a fired porosity between about 35% to about 60%.

2. The solid oxide fuel cell stack of claim 1 wherein the ceramic fibres and ceramic powder may be the same material or different and may comprise alumina or zirconia.

3. The solid oxide fuel cell stack of claim 2 wherein the seal has a pre-fired porosity of less than about 45%.

4. The solid oxide fuel cell stack of claim 3 wherein the seal has a pre-fired porosity of less than about 40%.

5. The solid oxide fuel cell stack of claim 4 wherein the seal has a pre-fired porosity of about 35%.

6. The solid oxide fuel cell stack of claim 1 or claims 2 to 5 which is formed by a tape casting process.

7. The solid oxide fuel cell stack of claim 6 which has a fired porosity of less than about 50% and greater than about 35%.

8. The solid oxide fuel cell stack of claim 7 which has a fired porosity of less than about 45% and greater than about 35%.

9. The solid oxide fuel cell stack of claim 8 which has a fired porosity of less than about 40% and greater than about 35%.

10. A composition for forming a gas seal against adjoining fuel cells in a solid oxide fuel cell stack comprising:
    ceramic fibres providing a matrix for retaining ceramic powder, and being capable of remaining flexible at operating temperatures of the fuel cell, and in an amount between about 5% to about 40% by weight;
    ceramic powder being disposed within the matrix, a substantial proportion of the ceramic powder having a particle size of about 5 μm in diameter; and in an amount between about 50% to about 90% by weight;
    the ceramic fibres and powder being capable of resisting sintering at operating temperatures of the fuel cell, wherein the seal is substantially free of binder and has a fired porosity between about 35% to about 60%;
    a plasticizer in an amount between about 1% to about 15% by weight;
    an organic binder in an amount between about 2% to about 5% by weight;
    a dispersant in an amount greater than about 1% by weight; and
    a solvent.

* * * * *